(12) United States Patent
Kiiveri

(10) Patent No.: US 8,621,191 B2
(45) Date of Patent: Dec. 31, 2013

(54) METHODS, APPARATUSES, AND COMPUTER PROGRAM PRODUCTS FOR PROVIDING A SECURE PREDEFINED BOOT SEQUENCE

(75) Inventor: Antti Kiiveri, Oulu (FI)

(73) Assignee: Nokia Corporation, Espoo (FI)

( * ) Notice: Subject to any disclaimer, the term of this patent is extended or adjusted under 35 U.S.C. 154(b) by 1192 days.

(21) Appl. No.: 11/964,440

(22) Filed: Dec. 26, 2007

(65) Prior Publication Data

US 2009/0172376 A1 Jul. 2, 2009

(51) Int. Cl.
*G06F 9/00* (2006.01)
*G06F 15/177* (2006.01)

(52) U.S. Cl.
USPC ............. 713/2; 713/1; 713/155; 713/189; 726/16; 726/21; 726/22; 726/26; 455/558; 455/425

(58) Field of Classification Search
USPC ............................................. 713/155
See application file for complete search history.

(56) References Cited

U.S. PATENT DOCUMENTS

| | | | |
|---|---|---|---|
| 6,463,535 B1 * | 10/2002 | Drews | 713/176 |
| 7,174,457 B1 | 2/2007 | England et al. | |
| 8,135,945 B2 * | 3/2012 | Gehrmann | 713/2 |
| 2003/0014663 A1 | 1/2003 | Sormunen et al. | |
| 2004/0064457 A1 * | 4/2004 | Zimmer et al. | 707/100 |
| 2005/0033969 A1 * | 2/2005 | Kiiveri et al. | 713/189 |
| 2006/0129795 A1 * | 6/2006 | Bulusu et al. | 713/2 |
| 2008/0077801 A1 * | 3/2008 | Ekberg | 713/187 |
| 2008/0301425 A1 * | 12/2008 | Mittapalli et al. | 713/2 |

* cited by examiner

Primary Examiner — Nathan Flynn
Assistant Examiner — Bryan Wright
(74) Attorney, Agent, or Firm — Alston & Bird LLP

(57) ABSTRACT

An apparatus for providing a secure predefined boot sequence may include a processor. The processor may be configured to verify a predefined boot sequence certificate that defines a boot sequence for a device, verify one or more software elements referenced by the predefined boot sequence certificate, and execute one or more software elements that have been verified in the sequence defined by the predefined boot sequence certificate. Corresponding methods, systems, and computer program products are also provided.

19 Claims, 2 Drawing Sheets

Figure 1:
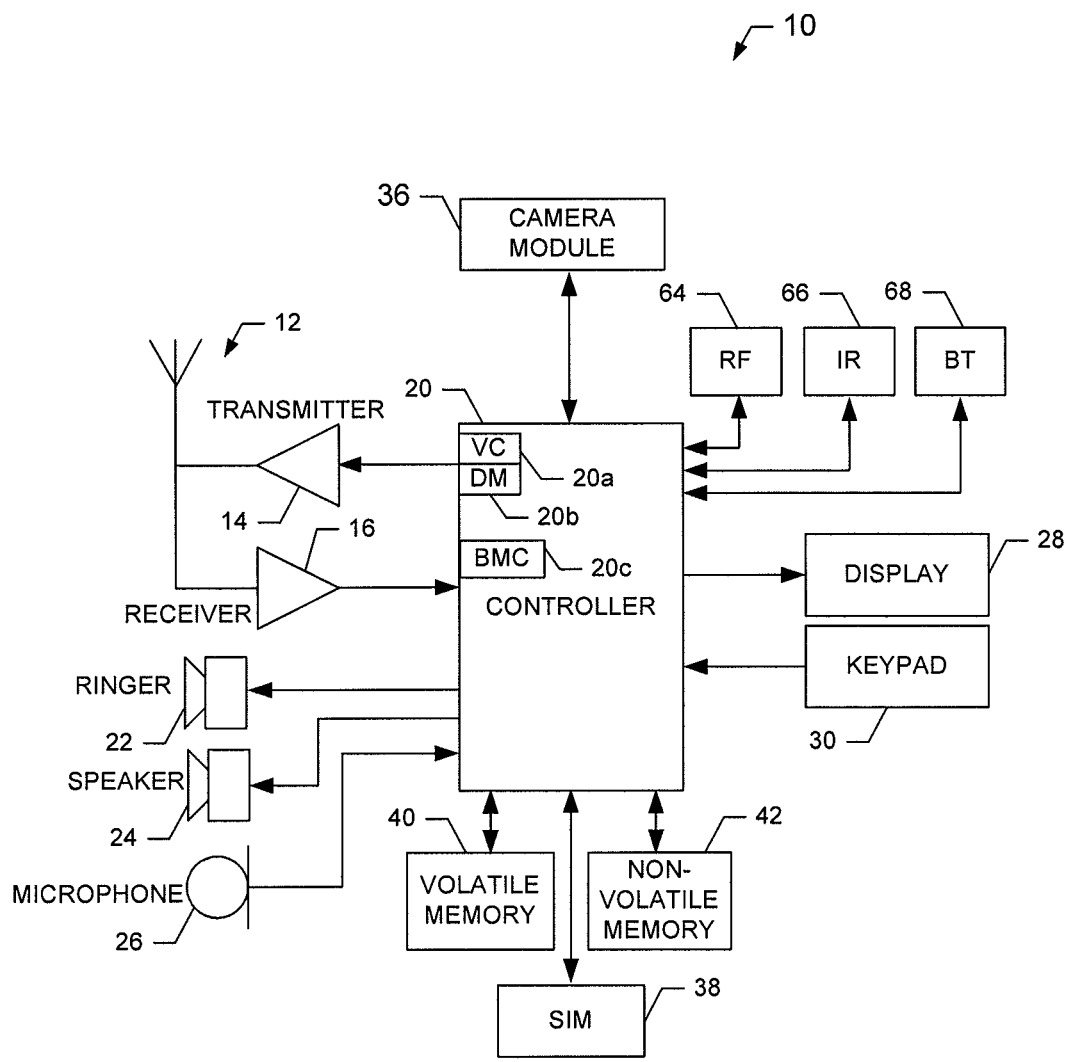

METHODS, APPARATUSES, AND COMPUTER PROGRAM PRODUCTS FOR PROVIDING A SECURE PREDEFINED BOOT SEQUENCE

TECHNOLOGICAL FIELD

Embodiments of the present invention relate generally to mobile communication technology and, more particularly, relate to methods, apparatuses, and computer program products for providing a secure predefined boot sequence for computing devices.

BACKGROUND

The modern communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer.

Current and future networking technologies continue to facilitate ease of information transfer and convenience to users. One area in which there is a demand to further improve the ease of information transfer and convenience to users involves the provision of security for mobile devices. As wireless and mobile networking technologies have provided for more flexibility and immediacy of information transfer, manufacturers have developed mobile devices with ever increasing computing capabilities, thus enabling the execution of an increasing array of sophisticated software applications, which allow for the conduction of business affairs from virtually any location using a mobile device.

Given the increasing capabilities and availability of powerful mobile devices and increasing reach of mobile networks, users now depend upon their mobile devices to manage important aspects of both their business and personal lives. As such, financial or other confidential data may be stored on mobile devices and transmitted or otherwise manipulated using mobile device applications. Therefore, not only do users depend on their mobile devices to operate in a stable, secure state so that they may conduct their business affairs, but also desire protection from hackers who may attempt to upload malicious software code to mobile devices so as to destabilize or otherwise exploit a security weakness of a mobile device in order to access valuable data stored on or transferred to and from a device.

It would therefore be desirable to address security concerns in mobile devices by ensuring that devices boot to a known stable state and execute only those software elements that are known to be secure and to do so in a known order. Accordingly, it may be advantageous to provide users with improved device boot method, which may alleviate some of the aforementioned security concerns.

BRIEF SUMMARY

A method, apparatus, computer program product, and system are therefore provided to enable the booting of a device to a known secure state. In particular, a method, apparatus, computer program product, and system are provided to ensure that a device boots to a known secure state by providing a verifiable predefined boot sequence certificate which references a sequence in which software elements should be verified and executed during the boot process. Accordingly, user experience may be enhanced by the use of devices with enhanced security measures.

In one exemplary embodiment, a method is provided, which may include verifying a predefined boot sequence certificate that defines a boot sequence for a device, verifying one or more software elements referenced by the predefined boot sequence certificate, and executing one or more software elements that have been verified in the sequence defined by the predefined boot sequence certificate.

In another exemplary embodiment, a computer program product is provided that includes at least one computer-readable storage medium having computer-readable program code portions stored therein. The computer-readable program code portions include first, second, and third executable portions. The first executable portion is for verifying a predefined boot sequence certificate that defines a boot sequence for a device. The second executable portion is for verifying one or more software elements referenced by the predefined boot sequence certificate. The third executable portion is for executing one or more software elements that have been verified in the sequence defined by the predefined boot sequence certificate.

In another exemplary embodiment, an apparatus is provided which may include a processor. The processor may be configured to verify a predefined boot sequence certificate that defines a boot sequence for a device, to verify one or more software elements referenced by the predefined boot sequence certificate, and to execute one or more software elements that have been verified in the sequence defined by the predefined boot sequence certificate.

In another exemplary embodiment, an apparatus is provided which may include means for verifying a predefined boot sequence certificate that defines a boot sequence for a device, means for verifying one or more software elements referenced by the predefined boot sequence certificate, and means for executing one or more software elements that have been verified in the sequence defined by the predefined boot sequence certificate.

In another exemplary embodiment, a system is provided which may include a computing device comprising a processor configured to execute a boot sequence, a memory associated with the computing device, a security subsystem, a predefined boot sequence certificate embodied in the memory and a plurality of software elements embodied in the memory and referenced by the predefined boot sequence certificate. The predefined boot sequence certificate of this embodiment defines a predefined boot sequence in which software elements should be verified and executed and an intended final state for the computing device following execution of the predefined boot sequence.

Embodiments of the invention may therefore provide a method, apparatus, computer program product, and system to enhance user experience during the use of computing devices. As a result, for example, users may benefit from using mobile terminals and other electronic devices with improved security and stability.

BRIEF DESCRIPTION OF THE SEVERAL VIEWS OF THE DRAWING(S)

Figure 2:
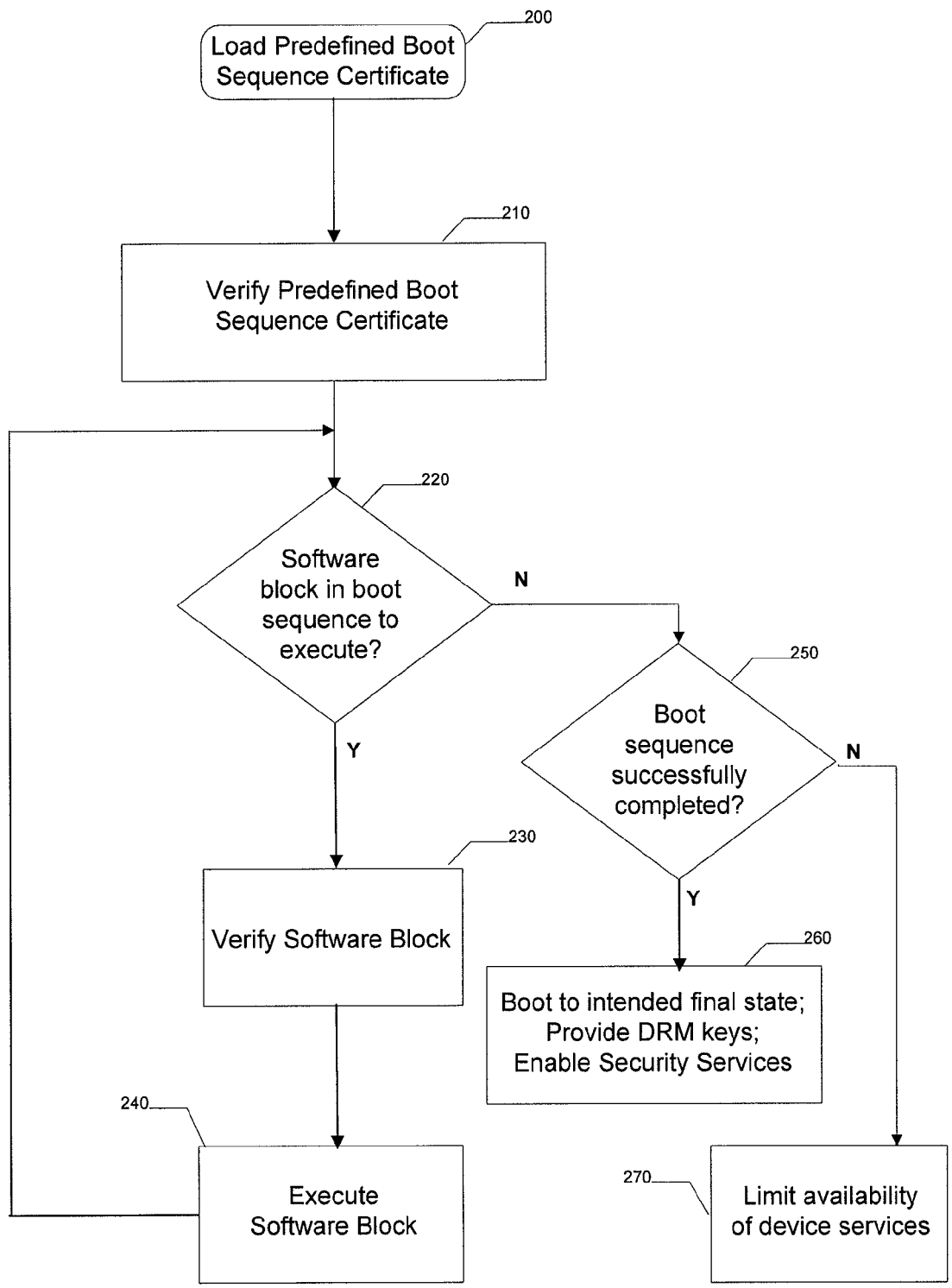

Having thus described embodiments of the invention in general terms, reference will now be made to the accompanying drawings, which are not necessarily drawn to scale, and wherein:

FIG. 1 is a schematic block diagram of a mobile terminal according to an exemplary embodiment of the present invention; and FIG. 2 is a flowchart of the operations for providing a secure predefined boot sequence according to an exemplary embodiment of the present invention;

DETAILED DESCRIPTION

Embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout.

FIG. 1 illustrates a block diagram of a mobile terminal 10 that may benefit from the present invention. It should be understood, however, that the mobile terminal illustrated and hereinafter described is merely illustrative of one type of electronic device that may benefit from embodiments of the present invention and, therefore, should not be taken to limit the scope of the present invention. While an embodiment of an electronic device is illustrated and will be hereinafter described for purposes of example, other types of electronic devices, such as portable digital assistants (PDAs), pagers, laptop computers, desktop computers, gaming devices, televisions, and other types of electronic systems, may employ embodiments of the present invention.

As shown, the mobile terminal 10 may include an antenna 12 in communication with a transmitter 14, and a receiver 16. The mobile terminal may also include a controller 20 or other processor that provides signals to and receives signals from the transmitter and receiver, respectively. These signals may include signaling information in accordance with an air interface standard of an applicable cellular system, and/or any number of different wireless networking techniques, comprising but not limited to Wireless-Fidelity (Wi-Fi), wireless LAN (WLAN) techniques such as IEEE 802.11, and/or the like. In addition, these signals may include speech data, user generated data, user requested data, and/or the like. In this regard, the mobile terminal may be capable of operating with one or more air interface standards, communication protocols, modulation types, access types, and/or the like. More particularly, the mobile terminal may be capable of operating in accordance with various first generation (1G), second generation (2G), 2.5G, third-generation (3G) communication protocols, fourth-generation (4G) communication protocols, and/or the like. For example, the mobile terminal may be capable of operating in accordance with 2G wireless communication protocols IS-136 (TDMA), GSM, and IS-95 (CDMA). Also, for example, the mobile terminal may be capable of operating in accordance with 2.5G wireless communication protocols GPRS, EDGE, or the like. Further, for example, the mobile terminal may be capable of operating in accordance with 3G wireless communication protocols such as a UMTS network employing WCDMA radio access technology. Some NAMPS, as well as TACS, mobile terminals may also benefit from embodiments of this invention, as should dual or higher mode phones (e.g., digital/analog or TDMA/CDMA/analog phones). Additionally, the mobile terminal 10 may be capable of operating according to Wireless Fidelity (Wi-Fi) protocols.

It is understood that the controller 20 may comprise the circuitry required for implementing audio and logic functions of the mobile terminal 10. For example, the controller 20 may be a digital signal processor device, a microprocessor device, an analog-to-digital converter, a digital-to-analog converter, and/or the like. Control and signal processing functions of the mobile terminal may be allocated between these devices according to their respective capabilities. The controller may additionally comprise an internal voice coder (VC) 20a, an internal data modem (DM) 20b, and/or the like. The controller may further comprise a boot management controller (BMC) 20c for controlling booting of the mobile terminal 10. The BMC 20c will be described more fully below in conjunction with the description of FIG. 2. Further, the controller may comprise functionality to operate one or more software programs, which may be stored in memory. For example, the controller 20 may be capable of operating a connectivity program, such as a Web browser. The connectivity program may allow the mobile terminal 10 to transmit and receive Web content, such as location-based content, according to a protocol, such as Wireless Application Protocol (WAP), hypertext transfer protocol (HTTP), and/or the like. The mobile terminal 10 may be capable of using a Transmission Control Protocol/Internet Protocol (TCP/IP) to transmit and receive Web content across Internet 50.

The mobile terminal 10 may also comprise a user interface including a conventional earphone or speaker 24, a ringer 22, a microphone 26, a display 28, a user input interface, and/or the like, which may be coupled to the controller 20. Although not shown, the mobile terminal may comprise a battery for powering various circuits related to the mobile terminal, for example, a circuit to provide mechanical vibration as a detectable output. The user input interface may comprise devices allowing the mobile terminal to receive data, such as a keypad 30, a touch display (not shown), a joystick (not shown), and/or other input device. In embodiments including a keypad, the keypad may comprise conventional numeric (0-9) and related keys (#, *), and/or other keys for operating the mobile terminal.

As shown in FIG. 1, the mobile terminal 10 may also include one or more means for sharing and/or obtaining data. For example, the mobile terminal may comprise a short-range radio frequency (RF) transceiver and/or interrogator 64 so data may be shared with and/or obtained from electronic devices in accordance with RF techniques. The mobile terminal may comprise other short-range transceivers, such as, for example an infrared (IR) transceiver 66, a Bluetooth™ (BT) transceiver 68 operating using Bluetooth™ brand wireless technology developed by the Bluetooth™ Special Interest Group, and/or the like. The Bluetooth transceiver 68 may be capable of operating according to Wibree™ radio standards. In this regard, the mobile terminal 10 and, in particular, the short-range transceiver may be capable of transmitting data to and/or receiving data from electronic devices within a proximity of the mobile terminal, such as within 10 meters, for example. Although not shown, the mobile terminal may be capable of transmitting and/or receiving data from electronic devices according to various wireless networking techniques, including Wireless Fidelity (Wi-Fi), WLAN techniques such as IEEE 802.11 techniques, and/or the like.

The mobile terminal 10 may comprise memory, such as a subscriber identity module (SIM) 38, a removable user identity module (R-UIM), and/or the like, which may store information elements related to a mobile subscriber. In addition to the SIM, the mobile terminal may comprise other removable and/or fixed memory. In this regard, the mobile terminal may comprise volatile memory 40, such as volatile Random Access Memory (RAM), which may comprise a cache area for temporary storage of data. The mobile terminal may comprise other non-volatile memory 42, which may be embedded and/or may be removable. The non-volatile memory may comprise an EEPROM, flash memory, and/or the like. The memories may store one or more software programs, instructions, pieces of information, data, and/or the like which may be used by the mobile terminal for performing functions of the mobile terminal. For example, the memories may comprise an identifier, such as an international mobile equipment identification (IMEI) code, capable of uniquely identifying the mobile terminal 10.

FIG. 2 is a flowchart of a system, method, and computer program product according to exemplary embodiments of the invention. It will be understood that each block or step of the flowcharts, and combinations of blocks in the flowcharts, may be implemented by various means, such as hardware, firmware, and/or software including one or more computer program instructions. For example, one or more of the procedures described above may be embodied by computer program instructions. In this regard, the computer program instructions which embody the procedures described above may be stored by a memory device of a mobile terminal, a server, or other computing device and executed by a processor of the mobile terminal, server, or other computing device. As will be appreciated, any such computer program instructions may be loaded onto a computer or other programmable apparatus (i.e., hardware) to produce a machine, such that the instructions which execute on the computer or other programmable apparatus create means for implementing the functions specified in the flowcharts block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the flowcharts block(s) or step(s). The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the flowcharts block(s) or step(s).

FIG. 2 will now be described in conjunction with FIG. 1 and in particular with the BMC 20c of FIG. 1. It will be appreciated, however, that embodiments of the invention are not limited to implementation by a mobile terminal 10 and may in fact be embodied on any computing device. In this regard, the BMC 20c may be configured to manage the boot process of a computing device, such as a mobile terminal 10. As such, the BMC 20c may be configured upon initial powering of the mobile terminal 10 by a user to access and load boot instructions and to follow the boot instructions by executing specified software elements, otherwise referred to as "blocks," in a predefined sequence. As used herein, "software blocks (elements)" may refer to software applications such as programs, operating systems (OS's) (such as Nokia's Symbian OS), or may be simple segments of code providing instructions for operating other software or hardware during the boot process.

According to embodiments of the present invention, the BMC 20c may initially at operation 200 load a predefined boot sequence certificate (PBSC). As contemplated by embodiments of the invention, the PBSC may define a sequence in which software blocks should be executed during the boot process as well as a final known secure state that the device should be booted to upon successful completion of the boot process. In some embodiments, the PBSC may further define security settings for the mobile terminal 10. As such, the PBSC may be used to define which security services are necessary to be enabled depending on the boot configuration.

The PBSC may be a file stored in memory, such as the non-volatile memory 42 or in a flash memory associated with the BMC 20c, which may be loaded and read by the BMC 20c. The file references the software blocks in sequence for execution so that the BMC 20c may identify and access the referenced software blocks in the predefined sequence and control their execution. Alternatively, the PBSC may be a block of addresses in a memory, such as the non-volatile memory 42 or a flash memory associated with the BMC 20c. In this alternate embodiment, the BMC 20c is configured to initially access a first address in the block. Each memory address or a plurality of consecutive memory addresses comprises an instruction in the boot sequence. In this regard, each memory address or plurality of consecutive memory addresses may comprise a pointer to another block of memory containing a software block for execution. As such, the sequence of software blocks for execution may be defined by the ordering of pointers within the memory block comprising the PBSC and the BMC 20c may control the boot process by accessing the pointers in sequence.

Next at operation 210, the BMC 20c may verify the PBSC. In this regard, the PBSC may further comprise a digital signature or other means for verification, such as a public/private key encryption pair or any of several other known verification methods that are well known in the art. The verification process may be managed by a security subsystem, such as Nokia's BB5 security subsystem. As such, the security subsystem may be configured to verify the PBSC such as by verifying a digital signature associated with the PBSC or through other appropriate verification procedures known in the art. The security subsystem may be embodied in software, hardware, or a combination of hardware and software, and as such may be embodied as or otherwise controlled by the BMC 20c. This verification of the PBSC at operation 210 ensures that the BMC 20c follows a trusted boot sequence to maintain the security and stability of the device by protecting the mobile terminal 10 and thus a user of the mobile terminal 10 from a fake boot sequence certificate or otherwise corrupted boot sequence certificate which may serve to destabilize the mobile terminal 10 or expose security weaknesses which a hacker may exploit. If the boot sequence certificate is not verified, then the BMC 20c may exit the boot sequence and reset the mobile terminal 10.

Next at operation 220, the BMC 20c may determine whether there is a software block referenced by the PBSC remaining to be executed. If there is a software block in the boot sequence remaining to be executed, then the software block may be verified at operation 230. Verification of software blocks may be performed by the security subsystem as described above in connection with operation 210 and as such each software block may comprise a digital signature or other verification means so that the software block may be verified by the security subsystem. If the subsystem cannot verify the software block then the BMC 20c may exit the boot sequence and reset the mobile terminal 10. Once the software block has been verified, the software block may be executed at operation 240. The BMC 20c may then return to operation 220 and repeat the cycle until all software blocks referenced by the PBSC have been executed in the predefined sequence.

Once the BMC 20c determines at operation 220 that there are no more software blocks referenced by the PBSC remaining to execute, the BMC 20c may determine at operation 250 whether the boot sequence was successfully completed. In this regard, the BMC 20*c* may determine whether the mobile terminal 10 has successfully booted to an intended known final state defined by the PBSC. The intended known final state defined by the PBSC represents an ideal secure state for the device wherein only trusted software blocks referenced by the boot sequence certificate have been successfully executed in the sequence in which they are referenced. In this regard then, the PBSC defines an expected end state after booting and a path leading to that expected end state. As such, the BMC 20*c* may perform operation 250 by determining whether all software blocks referenced by the PBSC were successfully executed in the sequence in which they were referenced. Alternatively, the PBSC may further comprise some indication representative of the expected final state which may be compared to the actual final state by the BMC 20*c* to determine whether the boot sequence was successfully completed.

If the BMC 20*c* determines that the boot sequence was successfully completed, then the BMC 20*c* may boot the mobile terminal 10 to the intended final status, at operation 260. Further at operation 260, the BMC 20*c* may provide any digital rights management (DRM) keys and enable security services associated with the mobile terminal 10 so that the mobile terminal 10 is fully operable and a user may interact with the mobile terminal 10 and utilize its capabilities. In this regard, all services of the security subsystem may be controlled. Thus, in addition to providing DRM keys, the BMC 20*c* may further control device authentication or encryption of memory. If, on the other hand the BMC 20*c* determines at operation 250 that the boot sequence was not successfully completed, the BMC 20*c* may limit the availability of services provided by the mobile terminal 10 at operation 270. This limitation of services may comprise limiting access to memory of the mobile terminal 10, limiting or prohibiting access to software applications or hardware functionalities of the mobile terminal 10, or resetting or otherwise disabling the mobile terminal 10.

In situations or embodiments in which the mobile terminal 10 is reset, the mobile terminal 10 may be powered off and repowered automatically and the BMC 20*c* may subsequently begin the boot process anew at operation 200. Therefore, the BMC 20*c* may not allow use of the mobile terminal 10 when it boots to a state other than the intended known secure state, wherein the mobile terminal 10 may be unstable or be vulnerable to attack from hackers who may exploit valuable confidential data. In exemplary embodiments, the BMC 20*c* may maintain a count of a number of consecutive attempts to boot the mobile terminal 10 for which the boot sequence failed to successfully reach the intended final state. This count may be stored in memory, such as non-volatile memory 42 or in a flash memory associated with the BMC 20*c*. In such embodiments then, the BMC 20*c* may reset the count to 0 at operation 260 if the boot sequence successfully completed. Operation 270 may then further comprise the BMC 20*c* determining whether the number of consecutive failed attempts has reached a predetermined maximum threshold. If not, then the BMC 20*c* may reset the mobile terminal 10 as described above. If the number of consecutive failed attempts has reached the predetermined maximum threshold then the BMC 20*c* may simply power down the mobile terminal 10 or even disable the mobile terminal 10 so that it may not be operated. In this regard, the BMC 20*c* may ensure that the mobile terminal 10 does not get stuck in an infinite cycle of boot attempts in situations where boot instructions such as the PBSC or software blocks referenced by the PBSC have become corrupted or have been sabotaged by the insertion of foreign code in the boot sequence instructions.

The above described functions may be carried out in many ways. For example, any suitable means for carrying out each of the functions described above may be employed to carry out embodiments of the invention. In one embodiment, all or a portion of the elements generally operate under control of a computer program product. The computer program product for performing the methods of embodiments of the invention includes a computer-readable storage medium, such as the non-volatile storage medium, and computer-readable program code portions, such as a series of computer instructions, embodied in the computer-readable storage medium.

As such, then, some embodiments of the invention provide several advantages to a user of a mobile terminal 10. For example, the provision of a secure predefined boot sequence ensures that a mobile terminal 10 boots to a known secure state. As such, the provision of a PBSC specifying a known secure state and a boot sequence to arrive at the known secure state ensures that the mobile terminal 10 will be stable in operation and may be less vulnerable to attack from hackers seeking to introduce or otherwise exploit security loopholes. Furthermore, it will be appreciated that while embodiments of the invention have been discussed in conjunction with a mobile terminal 10 of FIG. 1 for example, embodiments of the invention may be embodied on any computing device. As such, embodiments of the invention may improve the security and reliability of any computing device.

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method comprising:
    loading a predefined boot sequence certificate pre-stored on a memory associated with a mobile computing device to be booted,
    verifying, by a processor, the predefined boot sequence certificate, wherein the predefined boot sequence certificate defines a boot sequence for the device, security settings and an intended final state of the device; and
    in an instance in which the predefined boot sequence certificate is verified:
        verifying one or more software elements referenced by the predefined boot sequence certificate; and
        executing one or more software elements that have been verified in the sequence defined by the predefined boot sequence certificate.

2. A method according to claim 1, further comprising:
    following verifying each software element referenced by the predefined boot sequence certificate and executing the one or more software elements that have been verified, determining whether the boot sequence was successfully completed; and
    in an instance in which it is determined that the boot sequence was successfully completed, booting the device to the intended final state defined by the predefined boot sequence certificate.

3. A method according to claim 1, wherein verifying the predefined boot sequence certificate comprises a security subsystem of the device verifying the predefined boot sequence certificate.

4. A method according to claim 1, wherein verifying one or more software elements referenced by the predefined boot sequence certificate comprises a security subsystem of the device verifying the one or more software elements.

5. A method according to claim 1, further comprising determining whether the boot sequence was successfully completed, wherein if the boot sequence was successfully completed, the method further comprises enabling security services, and wherein if the boot sequence was not successfully completed, the method further comprises limiting services provided by the device.

6. A method according to claim 1, further comprising causing the predefined boot sequence certificate to be loaded from the memory of the device to be booted.

7. A computer program product comprising at least one non-transitory computer-readable storage medium having computer-readable program code portions stored therein, the computer-readable program code portions comprising:
 a program code portion configured to load a predefined boot sequence certificate pre-stored on a memory associated with a mobile computing device to be booted,
 a program code portion configured to verify a predefined boot sequence certificate, wherein the predefined boot sequence certificate defines a boot sequence for the device, security settings and an intended final state of the device; and
 a program code portion configured, in an instance in which the predefined boot sequence certificate is verified, to verify one or more software elements referenced by the predefined boot sequence certificate; and
 a program code portion configured to execute one or more software elements that have been verified in the sequence defined by the predefined boot sequence certificate.

8. A computer program product according to claim 7, further comprising:
 a program code portion configured, following verification of each software element referenced by the predefined boot sequence certificate and execution of the one or more software elements that have been verified, to determine whether the boot sequence was successfully completed; and
 a program code portion configured, in an instance in which it is determined that the boot sequence was successfully completed, to boot the device to the intended final state defined by the predefined boot sequence certificate.

9. A computer program product according to claim 7, wherein the program code portion configured to verify the predefined boot sequence certificate includes instructions configured to verify the predefined boot sequence certificate by causing a security subsystem of the device to verify the predefined boot sequence certificate.

10. A computer program product according to claim 7, wherein the program code portion configured to verify one or more software elements includes instructions configured to verify one or more software elements referenced by the predefined boot sequence certificate by causing a security subsystem of the device to verify the one or more software elements.

11. A computer program product according to claim 7, further comprising:
 a program code portion configured to determine whether the boot sequence was successfully completed; and
 a program code portion configured to enable security services if the boot sequence was successfully completed and to limit services provided by the device if the boot sequence was not successfully completed.

12. An apparatus comprising at least one processor and at least one memory storing computer program code, wherein the at least one memory and stored computer program code are configured, with the at least one processor, to cause the apparatus to at least:
 load a predefined boot sequence certificate pre-stored on a memory associated with a mobile computing device to be booted,
 verify a predefined boot sequence certificate, wherein the predefined boot sequence certificate defines a boot sequence for the device, security settings and an intended final state of the device; and
 in an instance in which the predefined boot sequence certificate is verified:
  verify one or more software elements referenced by the predefined boot sequence certificate; and
  execute one or more software elements that have been verified in the sequence defined by the predefined boot sequence certificate.

13. An apparatus according to claim 12, wherein the at least one memory and stored computer program code are configured, with the at least one processor, to further cause the apparatus to:
 following verification of each software element referenced by the predefined boot sequence certificate and execution of the one or more software elements that have been verified, determine whether the boot sequence was successfully completed; and
 in an instance in which it is determined that the boot sequence was successfully completed, boot the device to the intended final state defined by the predefined boot sequence certificate.

14. An apparatus according to claim 12, wherein the at least one memory and stored computer program code are configured, with the at least one processor, to cause the apparatus to verify the predefined boot sequence certificate by causing a security subsystem to verify the predefined boot sequence certificate.

15. An apparatus according to claim 12, wherein the at least one memory and stored computer program code are configured, with the at least one processor, to cause the apparatus to verify the one or more software elements by causing a security subsystem to verify the one or more software elements referenced by the predefined boot sequence certificate.

16. An apparatus according to claim 12, wherein the at least one memory and stored computer program code are configured, with the at least one processor, to further cause the apparatus to:
 determine whether the boot sequence was successfully completed;
 in an instance in which it is determined that the boot sequence was successfully completed, to enable security services; and
 in an instance in which it is determined that the boot sequence was not successfully completed, to cause only a limited set of services to be provided by the device.

17. An apparatus according to claim 12, wherein the at least one memory and stored computer program code are configured, with the at least one processor, to further cause the apparatus to load the predefined boot sequence certificate from the memory of the device to be booted.

18. An apparatus comprising:
 means for loading and verifying a predefined boot sequence certificate pre-stored on a memory of a mobile computing device to be booted, wherein the predefined boot sequence certificate defines a boot sequence for a device, security settings and an intended final state of the device;

means for, in an instance in which the predefined boot sequence certificate is verified, verifying one or more software elements referenced by the predefined boot sequence certificate; and means for executing one or more software elements that have been verified in the sequence defined by the predefined boot sequence certificate.

19. The apparatus of claim 12, wherein the apparatus comprises, or is embodied on the device, and wherein the device comprises a mobile phone, the mobile phone comprising a user interface configured to facilitate user control of at least some functions of the mobile phone through use of a display, the display being configured to display at least a portion of a user interface of the mobile phone to facilitate user control of at least some functions of the mobile phone.

\* \* \* \* \*